US007669777B2

(12) United States Patent
Hull et al.

(10) Patent No.: US 7,669,777 B2
(45) Date of Patent: *Mar. 2, 2010

(54) SLOPE PREDICTIVE CONTROL AND DIGITAL PID CONTROL FOR A VARIABLE TEMPERATURE CONTROL SYSTEM (75) Inventors: Gerry Glancy Hull, Atlanta, GA (US); Steven Treece Tom, Acworth, GA (US); Raynold Lee Saar, Marietta, GA (US)

(73) Assignee: Automated Logic Corporation, Kennesaw, GA (US)

( * ) Notice: Subject to any disclaimer, the term of this patent is extended or adjusted under 35 U.S.C. 154(b) by 136 days.

This patent is subject to a terminal disclaimer.

(21) Appl. No.: 11/811,767

(22) Filed: Jun. 12, 2007

(65) Prior Publication Data

US 2008/0114500 A1    May 15, 2008

Related U.S. Application Data (60) Division of application No. 10/804,278, filed on Mar. 19, 2004, now Pat. No. 7,246,753, which is a continuation-in-part of application No. 10/425,136, filed on Apr. 28, 2003, now Pat. No. 6,715,690, which is a continuation-in-part of application No. 09/850,422, filed on May 7, 2001, now Pat. No. 6,554,198.

(51) Int. Cl.
*F24F 7/00* (2006.01)
*G05B 13/02* (2006.01)
*G05D 7/00* (2006.01)

(52) U.S. Cl. .......................... 236/49.3; 700/48; 700/282

(58) Field of Classification Search ................ 236/49.3, 236/78 B, 78 D; 165/217; 318/610; 700/276, 700/282, 42, 37
See application file for complete search history.

(56) References Cited

U.S. PATENT DOCUMENTS

| | | | |
|---|---|---|---|
| 4,585,163 A | 4/1986 | Cooley et al. |
| 4,784,580 A | 11/1988 | Takata et al. |
| 4,899,809 A | 2/1990 | Takenaka et al. |
| 4,928,750 A | 5/1990 | Nurczyk |
| 5,043,862 A | 8/1991 | Takahashi et al. |
| 5,344,069 A | 9/1994 | Narikiyo |
| 5,450,999 A | 9/1995 | Scholten et al. |
| 5,682,329 A | 10/1997 | Seem et al. |
| 5,863,246 A | 1/1999 | Bukar, Jr. |
| 5,875,109 A | 2/1999 | Federspiel |
| 6,198,243 B1 | 3/2001 | Ritmanich et al. |

(Continued)

FOREIGN PATENT DOCUMENTS

JP    62-194159 A    8/1987

(Continued)

*Primary Examiner*—Chen-Wen Jiang
(74) *Attorney, Agent, or Firm*—Kinney & Lange, P.A.

(57) ABSTRACT

The present invention applies a slope predictive control method to a Variable Temperature Control (VTC) system, measuring the slope of the discharge temperature as a function of flow regulation device position, and using this slope to predict the position of the flow regulation device needed to achieve the desired discharge temperature. The present invention also monitors the response of the VTC over time and utilizes a self-learning algorithm to predict the response time of the system in order to determine when further control adjustments need to be taken.

16 Claims, 5 Drawing Sheets

U.S. PATENT DOCUMENTS

| | | |
|---|---|---|
| RE37,245 E | 6/2001 | Scholten et al. |
| 6,264,111 B1 | 7/2001 | Nicholson et al. |
| 6,265,843 B1 | 7/2001 | West et al. |
| 6,296,193 B1 | 10/2001 | West et al. |
| 6,445,980 B1 | 9/2002 | Vyers |
| 6,477,439 B1 | 11/2002 | Bemaden et al. |
| 6,549,826 B1 | 4/2003 | Pouchak et al. |
| 6,554,198 B1 * | 4/2003 | Hull et al. ............... 236/49.3 |
| 6,715,690 B2 * | 4/2004 | Hull et al. ............... 236/49.3 |

FOREIGN PATENT DOCUMENTS

JP    8-219507 A    8/1996

* cited by examiner

SLOPE PREDICTIVE CONTROL AND DIGITAL PID CONTROL FOR A VARIABLE TEMPERATURE CONTROL SYSTEM

RELATED APPLICATIONS

The present application is a divisional application of U.S. application Ser. No. 10/804,278, filed Mar. 19, 2004, now U.S. Pat. No. 7,246,753 which is a continuation-in-part of U.S. application Ser. No. 10/425,136, filed Apr. 28, 2003, now U.S. Pat. No. 6,715,690, which is a continuation of U.S. application Ser. No. 09/850,422, filed May 7, 2001, now U.S. Pat. No. 6,554,198, the contents of all of which are incorporated herein in their entirety by reference.

TECHNICAL FIELD

The present invention relates generally to control systems. More particularly, the present invention relates to Variable Air Volume (VAV) and Variable Temperature Control (VTC) temperature control systems.

BACKGROUND OF THE INVENTION

Variable Air Volume (VAV) temperature control systems control the temperature within a room by modulating the amount of cool (or warm) air that is blown into the room by the heating and air conditioning system. A pressure dependent VAV temperature control system uses a temperature control loop to accomplish a temperature control algorithm. The temperature control loop attempts to maintain a room temperature setpoint by using readings from a room temperature sensor to control a damper in a VAV box. Opening and closing the damper in the VAV box varies the airflow through the VAV box into the room.

One drawback to pressure dependent VAV temperature control systems is that a central Air Handling Unit supplies air to many VAV boxes and when the damper of one VAV box is opened or closed to adjust the temperature in its associated room, the airflow into the other rooms will be affected. This can cause the temperature control loops to "fight" each other, as a temperature change in one room will likely cause a flow change in the other rooms. As a result of the flow changes in the other rooms, the temperatures in those rooms will also change and as the VAV boxes in those rooms react to the temperature changes, they will cause more flow changes and the cycle is repeated. Accordingly, pressure dependent VAV control systems can be inefficient for controlling a heating, ventilation and air conditioning (HVAC) system within a sufficiently large building having multiple rooms.

A pressure independent VAV control system overcomes the problem of temperature control loops "fighting" each other and thus can be more efficient for controlling HVAC system in large buildings. A pressure independent VAV system uses two basic control loops to accomplish the temperature control algorithm. These two basic control loops include a flow control loop for maintaining a specified airflow to the room and a temperature control loop for adjusting the airflow setpoint (specified airflow) of the flow control loop based upon the room temperature. A pressure independent VAV control system thus maintains the specified airflow into the room regardless of pressure changes caused by airflow changes in other rooms.

However, pressure independent VAV control systems also have associated drawbacks. For example, one problem with a typical flow control loop in pressure independent systems is that it is very difficult to provide stable airflow into the room without excessively modulating the damper. The excessive modulation of a damper eventually causes the damper to fail and require replacement. System downtime and maintenance expenses incurred due to failed dampers are common problems in the temperature control industry.

Another drawback associated with a typical flow control loop in a pressure independent VAV control system is the effect of turbulent flow in the air ducts of the system. Electronic sensors can accurately measure instantaneous flow in the air ducts, but the turbulent flow can cause the resulting signals to be very noisy. If the noise in the signals is not filtered in some manner, the flow control loop will react to the peaks and valleys of the signals. As a result, the dampers in the VAV boxes will be continuously adjusted in response to the peaks and valleys in the signals, instead of being adjusted in response to what really affects the room temperature, which is the average airflow into the room over time.

Yet another problem associated with the typical flow control loop of a pressure independent VAV control system results from the inherent non-linear response curve of each damper within each VAV box and from the fact that the electric motors which move these dampers can be damaged by repeated short pulses of current which attempt to move the damper a very short distance. If the pulse is short enough, the motor may not build up enough torque to overcome the static friction needed to move at all. If the damper doesn't move, the flow conditions won't change so the control system will give it another short pulse. If no additional protection is taken, the control system can pulse the motor indefinitely and damage the motor.

To prevent this potential for indefinite pulsing, a minimum run time of, say, one second is typically provided by the motor control circuitry. If the damper controller turns the motor on for even a brief time, the motor control circuit will run the motor for at least one second, ensuring enough torque is developed to actually move the damper. This will, in turn, produce a change in the airflow. If less than a one second movement was needed to bring the flow to setpoint, this one second minimum run time can drive the damper too far and result in a flow reading on the other side of the setpoint. Without additional protection, this would result in the controller giving a short pulse to the damper to move it in the other direction.

The minimum run time would again cause the damper to overshoot the setpoint, and the system could cycle indefinitely, causing excessive wear on the damper and the motor. To prevent this, a deadband is typically set so that the dampers do not move if the measured flow is within a specified tolerance of the setpoint. To prevent cycling, this deadband must be greater than the change in flow caused by a one second damper movement. The "worst case situation," where a little damper movement produces a large change in airflow, typically occurs about mid-range on the damper response curve. In order to avoid cycling in this worst case situation, the flow control loop needs a deadband which is at least as wide as the flow change produced by a one second damper movement at this point.

However, a wide deadband produces inaccurate control at the low and high end of the damper response curve. The low end of the damper response curve is particularly problematic, because of indoor air quality concerns. A temperature control system not only modulates the airflow to keep the temperature in the room at a comfortable level, but also provides the minimum fresh air ventilation for the room. Therefore, a low flow rate and a very wide deadband may cause the airflow control loop to maintain a flow rate that is below the minimum ventilation flow, and cause a problem for indoor air quality.

While the aforementioned problems affect the flow control loop in pressure independent VAV systems, the temperature control loop in such system may also suffer from problems that affect its performance. The temperature control loop typically uses a traditional proportional, integral and derivative (PID) control algorithm to adjust the flow setpoint based upon the temperature in the room. For stable control, low gains are needed for the PID components, but for accurate control high gains are needed. Finding the correct gains is often a difficult process (called "tuning" the control system) and the result is a compromise between stability and accuracy.

A related problem exists in the control of Variable Temperature Control (VTC) temperature control systems. A typical example is the control of a heat exchange device (e.g., a coil or similar device) controlled by a flow regulation device (e.g., a control valve or similar device) adjusted by a micro-controller. Typically a PID control algorithm is used to determine the required position of the flow regulation device. This implementation suffers from at least the following drawbacks (1) the PID algorithm is best suited to linear systems, but the response curve of the heat exchange device and flow regulation device is non-linear, (2) the gains of the PID algorithm are not known and require considerable experience and trial-and-error adjustment to give satisfactory results, and (3) the response time of the system typically involves long time delays, and the time delay can be considerably longer at start-up, when the heat exchange device, heat exchange medium (water or other media), and media source (boiler, chiller, or other device) are not at normal operating temperature; the response times are not known in advance and cannot easily be predicted.

Accordingly, there remains a need for an improved control system that overcomes some or all of the problems mentioned above.

SUMMARY OF THE INVENTION

The present invention provides an airflow control loop that uses averaged airflow measurements without the problems that are normally encountered with averaging measurements, such as the delay introduced into the airflow control loop. This is accomplished, in the present invention, through the predictive control scheme. For example, the present invention measures the slope of the discharge temperature as a function of flow regulation device position and uses this slope to predict the position of the flow regulation device needed to achieve the desired discharge temperature. The present invention also monitors the response of a Variable Temperature Control (VTC) over time and utilizes a self-learning algorithm to predict the response time of the system in order to determine when further control adjustments need to be taken.

In accordance with one embodiment of the present invention, a VTC temperature control system includes a VTC box and a flow regulation device for controlling a volume of non-solid substance delivered to a heat exchange device within the VTC box, as well as a discharge air temperature sensor for measuring the discharge air temperature from the system. The VCT system also may use a room temperature sensor for measuring room temperature.

The VCT system includes a micro-controller for executing computer-executable instructions for receiving or calculating a temperature setpoint, typically based on a room temperature measurement from the room temperature sensor. A discharge air temperature measurement is also received and an error is calculated between the two temperature measurements.

The VCT system cycles through a number of steps until the time that a new room temperature measurement is received and a new temperature setpoint is calculated. Based on the previously calculated error, the system predicts a flow regulation device position adjustment in order to reach the temperature setpoint. If the predicted position adjustment is greater than a minimum position adjustment, the system receives discharge air temperature measurements from the discharge air temperature sensor while generating the signal for actuating the flow regulation device the predicted position adjustment or until one of the discharge air temperature measurements is determined to have crossed the temperature setpoint. After the movement of the flow regulation device, the system receives discharge air temperature measurements from the discharge air temperature sensor to calculate the average discharge air temperature and recalculates the error.

DETAILED DESCRIPTION OF EXEMPLARY EMBODIMENT

The present invention now will be described more fully hereinafter with reference to the accompanying drawings, in which preferred embodiments of the invention are shown. The present invention may be adapted for use in a wide variety of applications and is suitable for any temperature control system comprising a flow regulation device. By way of illustration and not by way of limitation, unless indicated otherwise, the preferred embodiment is presented in the context of a Variable Temperature Control (VTC) system, wherein the control flow device is a valve. The initial discussion, however, pertains to the application of the present invention to a Variable Air Volume (VAV) system, wherein the flow control device is a damper.

In one embodiment, the present invention provides flow and temperature control loops to accomplish a Variable Air Volume (VAV) temperature control algorithm in a manner that addresses the problems encountered in the control of prior art pressure independent VAV control systems.

To address the problem of noisy instantaneous signals representing flow measurements, the present invention averages the instantaneous flow measurements over a period of time. The averaging technique serves to settle and eliminate a significant amount of the noise in the instantaneous flow measurement signals, and provides a better measurement of the average airflow into the room. Normally, when flow measurements are averaged over time, delay is introduced into the control loop. This delay causes the flow controls to overshoot the setpoint because by the time the averaging of the measurements is complete, the airflow control damper has moved past the desired position. The present invention avoids the overshoot problem by using instantaneous flow readings in situations where a fast response is needed, then using average flow readings to get an accurate reading of the flow after the damper is moved and by using a predictive algorithm (rather than feedback control) for the next damper movement.

Figure 1:
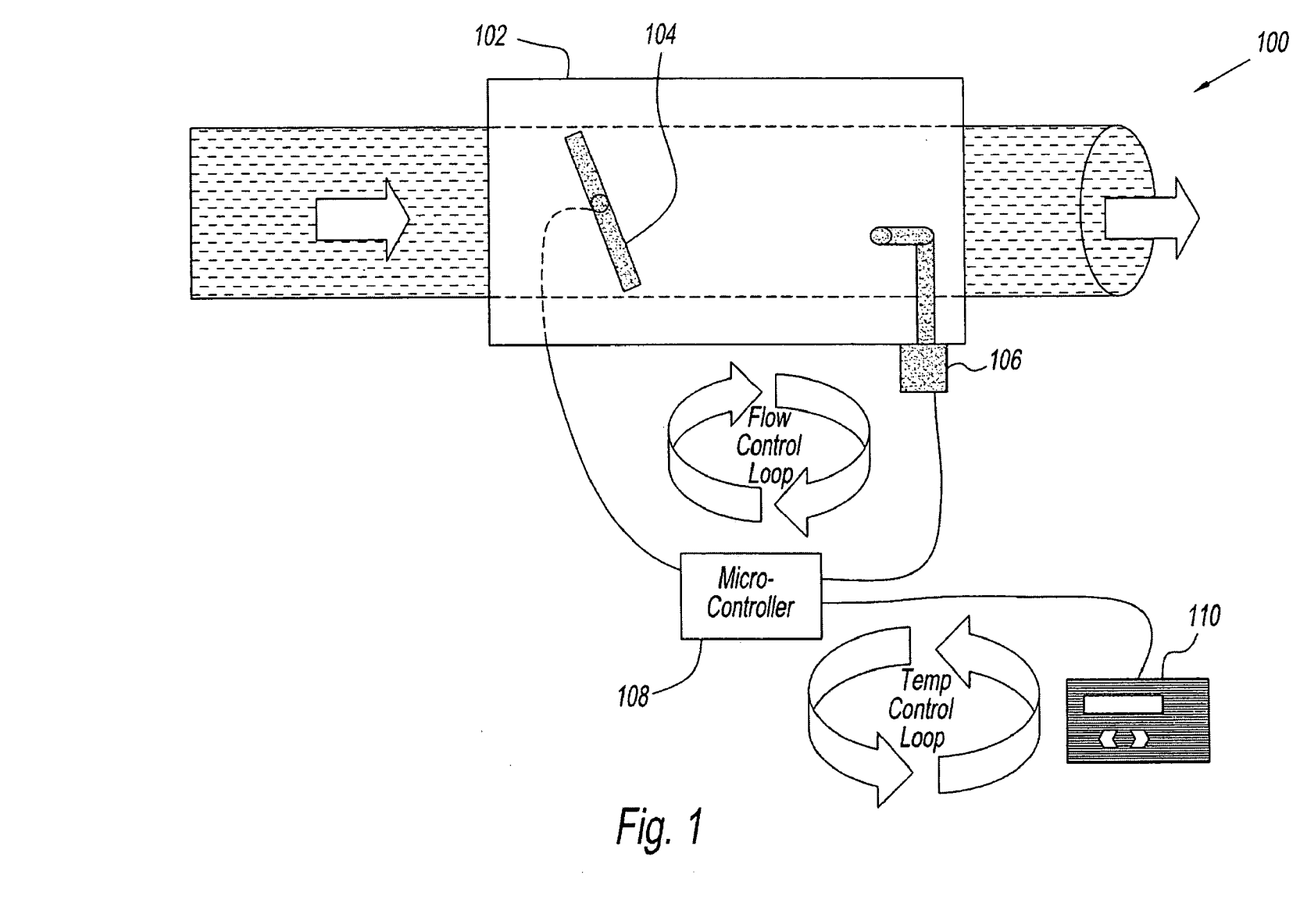
FIG. 1 is a pictorial diagram of the Pressure Independent VAV Control System of the present invention.

The following description will hereinafter refer to the drawings, in which like numerals indicate like elements throughout the several figures. FIG. 1 is a pictorial diagram of an illustrative system 100 for implementing the Variable Air Volume (VAV) temperature control algorithm of an exemplary embodiment of the present invention. The system 100 comprises a VAV box 102, an airflow control damper 104, an airflow sensor 106, a micro-controller 108, and a room temperature sensor 110. The flow control loop measures the airflow into a room, using measurements from the airflow sensor 106. Airflow measurements are used to calculate the slope of the airflow damper response curve (change in flow per unit of time) every time the airflow control damper 104 moves for a measured period of time. For example, the flow control loop may be configured to calculate the change in airflow when the control damper 106 moves for at least one second. A calculated change in airflow can then be used to predict how long the airflow control damper 104 must move in order to deliver the appropriate flow rate needed for maintaining the desired room temperature setpoint.

If the temperature control loop makes a substantial change in the airflow setpoint, the nonlinear characteristic of the damper response curve may cause the predicted damper movement time, which is based upon the slope of the damper response curve at the current operating point, to be incorrect. Thus, in accordance with the present invention, when large setpoint changes occur, an instantaneous reading is used to control the movement of the airflow control damper 104. In this situation, the airflow control damper 104 is moved until another instantaneous airflow is measured that is near or at the new airflow setpoint. Then, the airflow control damper 104 is stopped and an average airflow reading is taken over a particular period of time. At this point, the flow control loop has determined that the actual airflow in the room is near the airflow setpoint, but the flow control loop has not determined the exact damper adjustment that is required to reach the airflow setpoint. The exact duration of the damper movement or adjustment for reaching the desired airflow setpoint is determined using the time duration of the initial damper movement and the average change in airflow during that time duration. From these measurements, the flow control loop determines the sensitivity of the airflow control damper 104 (the slope of the damper response curve). The sensitivity of the airflow control damper 104 is determined in terms of CFM or flow rate per second movement at a particular area on the damper's response curve.

Therefore, once the flow control loop has determined from the instantaneous airflow measurement that the actual airflow in the room is close to the airflow setpoint, the flow control loop calculates the slope of the damper response curve and is able to predict how long the airflow control damper 104 must move to reach the airflow setpoint. This second corrective movement is made based on the damper runtime predicted by the flow control loop. The control loop does not base this second corrective movement on instantaneous airflow measurements, which include a substantial amount of noise. The second corrective movement of the airflow control damper 104 is based upon the sensitivity of the airflow control damper 104 measured in terms of average change in airflow over the initial damper movement time.

Once the airflow control damper 104 completes the predicted movement, the airflow control damper 104 is stopped. Then, the airflow control loop measures the average airflow in the room. The airflow control loop uses the average airflow measurement because an average measurement reduces the noise in the flow measurement and provides an improved measurement of the actual flow into the room. The average airflow is critical in maintaining the room temperature setpoint because the average flow delivered to the room directly affects the room temperature.

In a preferred embodiment of the present invention, the airflow control loop uses the averaged airflow measurements without the problems that are normally encountered with averaging measurements, such as the delay introduced into the airflow control loop. This is accomplished, in the present invention, through the predictive control scheme mentioned above. The predictive control scheme of the airflow control loop calculates the damper sensitivity, the predicted damper runtime, and then moves the damper for the predicted runtime.

As a further enhancement of the present invention, the flow control loop may be configured such that no corrective movement of the airflow control damper 104 will occur if the predicted runtime is less than a predetermined minimum time period. The flow control loop may thus use the predictive control scheme to achieve an airflow that is within a narrow deadband surrounding the airflow setpoint and not move the airflow control damper 104 unless there is a substantial change in the airflow, so that the average airflow deviation from the airflow setpoint requires a damper movement that is more than the predetermined minimum runtime.

As a result of using a minimum runtime, the flow control loop minimizes the movement of the flow control damper 104 and increases the life of the damper operator mechanism (not shown). It has been discovered by the inventors that the predictive flow control loop of the present invention decreases the movement of the air flow control damper 104 by a factor of ten to a factor of one hundred as compared to the damper movements of a conventional control system.

In addition to the unique airflow control loop used to maintain the constant airflow into the room, the present invention also implements a digital form of proportional, integral, and derivative (PID) control to maintain the room temperature. The digital form of PID control has the same general characteristics of traditional PID control, but uses gains which vary according to how far the measured temperature is from setpoint. For example, if the room temperature is far above the temperature setpoint, the temperature control loop calls for full cooling to cool the room quickly and return the room temperature to the room temperature setpoint. The temperature control loop takes this approach to quickly satisfy the room temperature as well as to minimize the damper movement. While in this full cooling mode, a high integral gain is used to quickly adjust the integral portion of the PID algorithm to better suit the current operating conditions. The magnitude of this integral gain depends on how far the integral term was from saturation at the time the controller called for full cooling.

Once the temperature is near setpoint, the temperature control loop uses lower proportional, integral, and derivative gains to fine tune the control and reach setpoint. A variation of traditional PID control is used at this point, the variation being that a fixed integral adjustment is used each time cycle, rather than an adjustment that varies with the error (difference between the measured temperature and the setpoint) and the derivative term acts to counteract the integral term whenever it senses the error is changing in the correct direction, and enables the integral term whenever it senses that the error is unchanging or is changing in the wrong direction. When the temperature is very close to the temperature setpoint, the integral and derivative control terms are disabled and a very low proportional gain is used to maintain these conditions. In other words, the temperature control loop acts as if it were using on/off control at the extremes, it uses a modified PID control when the temperature is within an acceptable range of setpoint, and it uses proportional control when the temperature is within a very narrow "deadband" of the setpoint.

Traditional integral control is proportional to the error, which is defined as the temperature deviation from setpoint. Since the integral action is proportional to the error as the temperature comes close to setpoint the temperature control loop calls for finer control movements. In order to achieve faster response in reaching setpoint and minimize the damper movement, if the temperature is above setpoint, this control scheme adjusts the integral action by some minimal amount every minute regardless of the error. For example, the integral action may be adjusted by 1% for every minute. Furthermore, the temperature control loop does not decrease the adjustment as the temperature comes closer to setpoint.

If the temperature is outside the cooling temperature threshold, the temperature control loop calls for either a 100% or 0% cooling. If the system is also used to provide heating, the control loop similarly calls for 100% or 0% heating when the temperature is outside the heating threshold. In this circumstance, the temperature control loop also starts to accumulate the integral action much faster.

Because of the higher integral gain, when the temperature comes within the temperature threshold, the integral term is much closer to where it should be to obtain the temperature setpoint. The speed with which the integral output is built up depends on the distance that the damper was from its maximum damper position when the temperature control loop initiated the full cooling or heating mode. For example, if the damper is 20% open at the initiation of the full cooling or heating mode, the integral output is accumulated much faster than if the damper was at 80% open. The integral output is non-linear. Once the temperature control loop returns the room temperature to within the threshold, the fine tuning adjustments are used to stay within the temperature threshold.

The present invention also uses the derivative action to act on the integral gain. The temperature control loop uses the derivative action in this manner because in digital systems the temperature control loop can only measure the temperature in one-bit increments. In between the one-bit increments, there is no detected change in temperature, therefore the derivative action will only take effect when the controller registers the one bit change from one measurement to the next. In digital systems, therefore, conventional derivative action becomes discontinuous and the derivative gain may be set so low that it is ineffective or the derivative gain may be set so high that it drives the controller output in the opposite direction.

In the present invention, if the temperature is not changing or if the temperature is moving away from setpoint, the temperature control loop allows the integral gain to act normally. This is the normal mode of operation. When the temperature starts moving toward setpoint, the temperature control loop actually decreases the integral gain to avoid overshooting the temperature setpoint.

From the above description of the present invention, it will be apparent to one of ordinary skill in the art that this invention can be implemented as computer executable instructions that can be executed on any processor-driven system. Having described the system 100 for implementing the slope predictive control and the digital PID control in accordance with an embodiment of the present invention, illustrative methods of carrying out the invention will be described with reference to FIG. 2 and FIG. 3.

Figure 2:
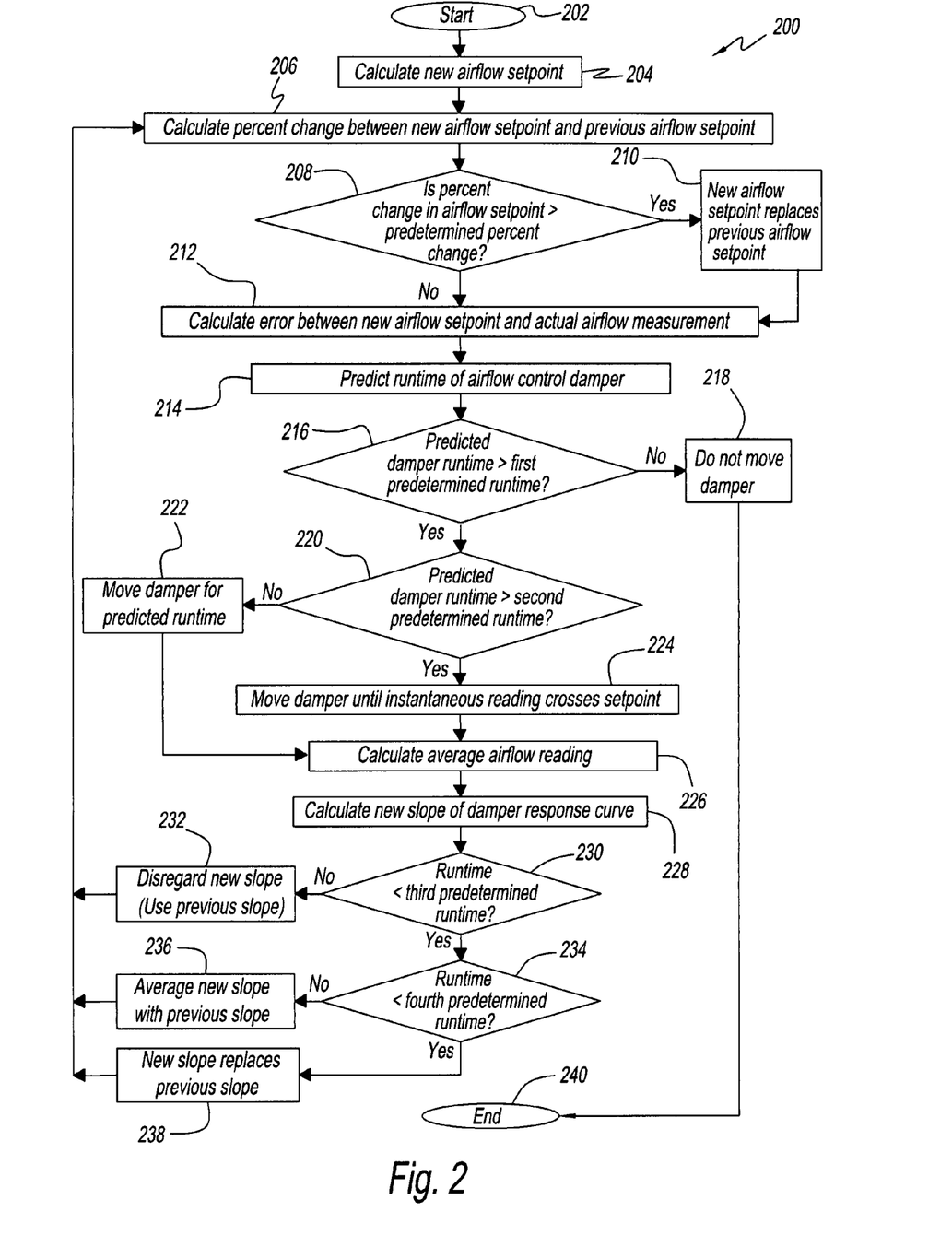
FIG. 2 is a flow diagram illustrating the Slope Predictive Control Method of the present invention.
Figure 3:
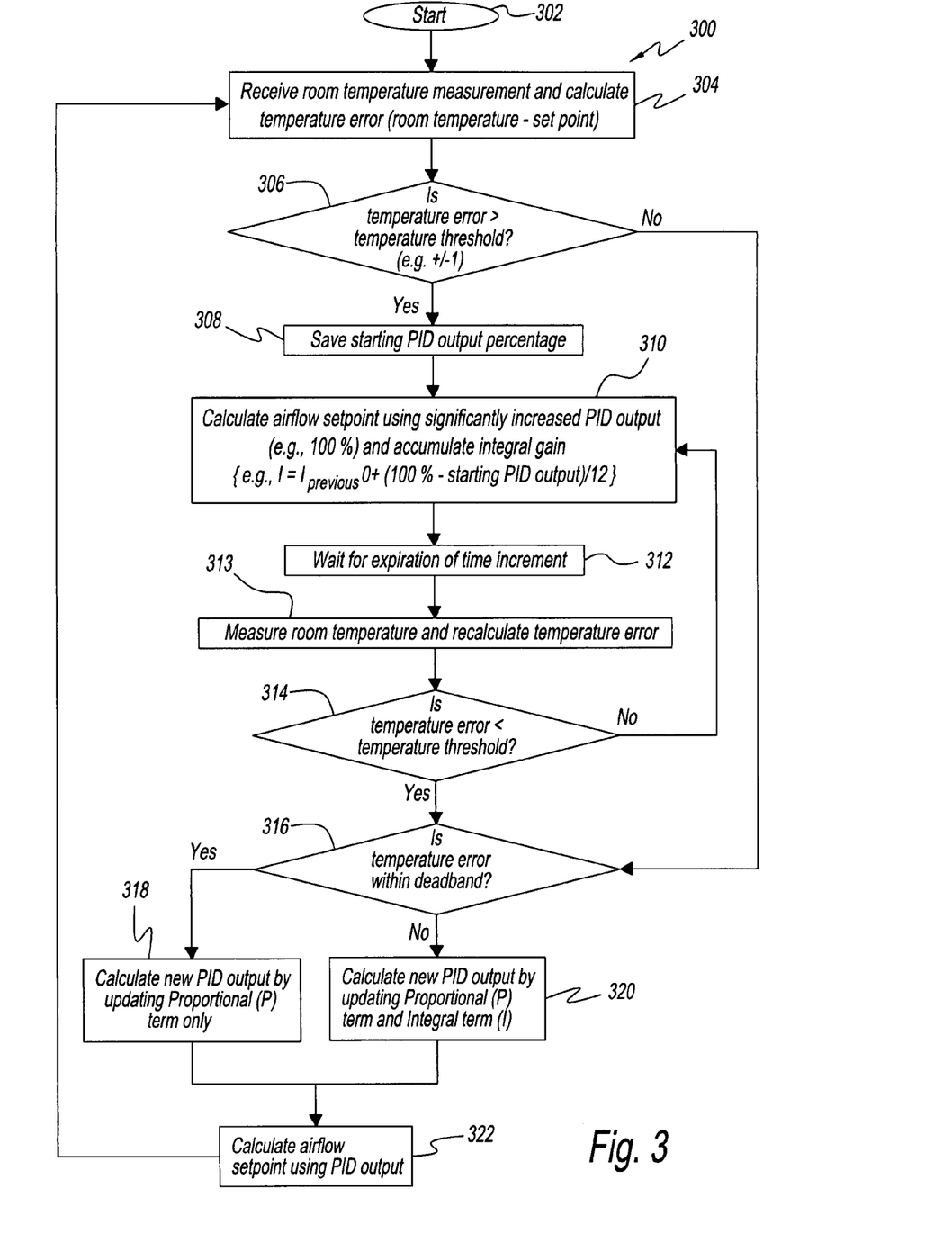
FIG. 3 is a flow diagram illustrating the Digital PID Control Method of the present invention.

FIG. 2 is a flow diagram of an illustrative Slope Predictive Control method 200 for controlling airflow control damper movement and maintaining the airflow setpoint into a room. The illustrative method 200 will be described below with reference to the elements of system 100. The Slope Predictive Control method 200 begins at start step 202 and proceeds to step 204 where a new airflow setpoint (NewFlowSp) is received from the temperature control loop. By way of illustrations, the new airflow setpoint may be calculated by the temperature control loop using the following formula:

$$NewFlowSp = PID_{out} * MaxCFM$$

where $PID_{out}$ is the PID output of the PID control (see FIG. 3 below) of the present invention and MaxCFM is the maximum CFM for the particular VAV box. Next the method 200 proceeds to step 206.

At step 206, the percent change between the new airflow setpoint and the previous airflow setpoint is calculated. For example, the change in airflow setpoint may be calculated using the following formula:

$$\% \Delta SP = \frac{FlowSp_{new} - FlowSP_{previous}}{MaxCFM}$$

where $\% \Delta SP$ is the percent change in the airflow setpoint, $FlowSp_{new}$ is the newly calculated airflow setpoint value and $FlowSp_{previous}$ is the last airflow setpoint.

Next the method 200 proceeds to step 208, where a determination is made as to whether the percent change in airflow setpoint is greater than a predetermined percent change in setpoint. For example, the predetermined percent change in setpoint may be set at 5% or some other system operator definable percentage. If at step 208 it is determined that the percent change in setpoint (calculated at step 206) is greater than the predetermined percent change in setpoint, the method 200 proceeds to step 210. At step 210, the new airflow setpoint (calculated at step 204) replaces the previous airflow setpoint. From step 210, the method 200 proceeds to step 212.

However, if it was determined at step 208 that the percentage change in setpoint (calculated at step 206) is less than the predetermined percent change in setpoint, the method 200 proceeds to step 211, where the new setpoint is disregarded in favor of the previous setpoint. From step 211, the method 200 proceeds to step 212.

At step 212, the actual airflow is measured and the error between the airflow setpoint (from step 210 or step 211) and the actual flow measurement is calculated. The actual airflow measurement is preferably measured as an average over a predetermined period of time. Next at step 214, the runtime of the airflow control damper 104 is predicted. In one embodiment of the present invention, the predicted runtime of the airflow control damper 104 is calculated by dividing the error between the airflow setpoint and the actual airflow by the slope of the damper response curve. In the initial pass through the method 200, the slope of the damper response curve is set to a predetermined value or is calculated, for example, by dividing the maximum CFM by the predicted runtime of the airflow control damper 104. For any other iteration through the method 200, the slope is calculated by dividing the measured change in average airflow (see steps 226 & 228 below) by the actual runtime of the airflow control damper 104 from the most recent damper movement.

Once the airflow control damper movement is predicted, the method 200 proceeds to step 216. At step 216, a determination is made as to whether the predicted damper runtime is greater than a first minimum runtime, which is required to protect the damper motor. This minimum runtime may be, for example, 1 second. If at step 216, it is determined that the predicted damper runtime time is less than the first minimum runtime, the method 200 proceeds to step 218 and the airflow control damper 104 is not moved. From step 218, the method 200 returns to step 212 and the process is repeated. However, if it is determined at step 216 that the predicted damper runtime is greater than the first minimum runtime, the method proceeds to step 220, where it is determined whether the predicted damper runtime is greater than a second minimum runtime. The second minimum runtime determines whether the damper movement is short enough that the current slope measurement can accurately be used to predict the required run time. The second minimum runtime may be set at, for example, 11 seconds or any other system operator definable duration. If the predicted movement time is less than the second minimum runtime, then, at step 222, the airflow control damper 104 is run for the predicted damper runtime. However, if at step 220 it is determined that the predicted runtime is greater than the second minimum runtime, the method 200 proceeds to step 224. At step 224, the airflow control damper 104 is run until the airflow sensor 106 supplies an instantaneous reading to the micro-controller 108 indicating that the actual airflow is greater than the airflow setpoint.

After the appropriate movement of the damper at either step 222 or step 224, the method 200 advances to step 226, where the micro-controller 108 calculates a new average airflow reading. Next at step 228, a new slope of the damper response curve is calculated. The slope is calculated by dividing the change in average airflow by either the damper runtime of step 222 or the damper runtime of step 224. The change in average airflow is calculated by taking the absolute value of the difference between the previous average airflow reading (from the previous iteration) and the new average airflow reading calculated at step 226.

After determining the new slope of the damper response curve, method 200 proceeds to step 230, where it is determined whether the predicted damper runtime (calculated at step 214) was less than or equal to a third minimum runtime. This third minimum runtime represents the minimum damper movement needed to get an accurate reading of the slope of the damper response curve, taking into consideration the fact that the real-world damper linkage will have hysteresis and other non-linearities that affect the accuracy of short damper movements. By way of example only, the third minimum runtime may be two seconds or some other system operator definable duration. If the predicted damper runtime is less than or equal to the third minimum runtime, the method 200 proceeds to step 232, where the new slope of the damper response curve (calculated at step 228) is disregarded and the previously calculated slope value is used in the next iteration of the method 200. The new slope calculation is disregarded at step 232 because, for a sufficiently short damper runtime, the build-up in the motor magnetic field, motor friction, and slop in the damper linkage make it difficult to take an accurate measurement of the actual damper runtime and therefore leads to an inaccurate measurement of the slope of the damper response curve.

If at step 230 it was determined that the predicted damper runtime was not less than or equal to the third minimum runtime, the method 200 proceeds to step 234, where it is determined whether the damper runtime (executed at either step 222 or 224) was within a predetermined runtime range. By way of example only, the predetermined runtime range may be from may be from greater than two (2) seconds to less than or equal to four (4) seconds. If at step 234 the damper runtime is determined to be within the predetermined runtime range, the new slope of the damper response curve (calculated at step 228) is averaged with the previous slope of the damper response (i.e., the slope value used in the previous iteration of the method 200) at step 236. The new slope value and the previous slope value are averaged in order to minimize inaccuracies in the slope calculation due to build-up in the motor magnetic field, motor friction, and slop in the damper linkage. Once step 236 is complete, the method 200 returns to step 212 and begins a new iteration.

However, if at step 234 it is determined that the damper runtime (executed at either step 222 or 224) is not within the predetermined runtime range, the method 200 proceeds to step 238, where the new slope of the damper response curve (calculated at step 228) replaces the previous slope value. After step 238 is complete, the method 200 returns to step 212 and begins a new iteration. Those skilled in the art will appreciate that the flow control method 200 may be continuously repeated in order to maintain the airflow in a room for a given airflow setpoint. If at any point during execution of the method 200 a new airflow setpoint is received from the temperature control loop, the method is restarted from step 202.

FIG. 3 is a flow diagram illustrating an exemplary digital Proportional, Integral and Derivative (PID) control method 300 used for setting an appropriate airflow setpoint to maintain a room temperature. The digital PID control method 300 begins at start step 302 and then proceeds to step 304, where the temperature error is calculated. The temperature error may be calculated by determining the difference between the average room temperature measured over a period of time and the room temperature setpoint. The period of time for measuring the average room temperature may be, for example, 10 seconds.

Next at step 306, a determination is made as to whether the temperature error (calculated at step 304) is greater than a temperature threshold value. The temperature threshold may be defined by the system operator. This threshold determines if the temperature is close enough to setpoint to use the moderate PID gains, or if output needs to jump to 100% or 0% to bring the temperature back into a tolerable range as quickly as possible. This threshold value may be, say +/−1 degree Fahrenheit. If it is determined at step 306 that the temperature error is not greater than the temperature threshold, the method 300 proceeds to step 316, which is explained below. However, if it is determined at step 306 that the temperature error is greater than the temperature threshold, the method 300 proceeds to step 308, where the starting PID output percentage is saved. Once the starting PID is saved at step 308, the method 300 proceeds to step 310. At step 310, the airflow setpoint is calculated using a significantly increased or decreased PID output percentage (e.g., a PID output percentage of 100% or 0%, depending on whether the room was too hot or too cold.) A setting of 100%, for example, fully opens the airflow control damper 104 to provide full cooling to the room with a minimum number of damper movements. For simplicity of explanation, only the case where the temperature is above setpoint will be described in the following steps. The situation where the temperature is below setpoint is identical, except that the integral term (I) is decreased rather than increased with each step.

Also at step 310, the integral term (I) of the PID control is accumulated. The integral term (I) of the PID control may be accumulated, for example, using the formula that follows:

$$I = I_{previous} + (100\% - \text{Starting Output})/12$$

$I_{previous} = 0$, at startup

Those skilled in the art will recognize that the term "12" in the above equation may be replaced by any fixed divisor. From step 310, method 300 proceeds to step 312 to wait for the expiration of an increment of time. After the increment of time expires, the method proceeds to step 313 for a measurement of the room temperature and a new calculation of the temperature error (the difference between the average room temperature measured over a period of time and the room temperature setpoint). Then at step 314 it is determined whether the temperature error is greater than the temperature threshold value. If the temperature error is still greater than the temperature threshold value, the method 300 returns to step 310 and performs the calculations described above.

However, if it is determined at step 314 that the temperature error is not greater that the temperature threshold value, the method 300 proceeds to step 316, where it is determined if the error is within a deadband near the temperature setpoint. If the error is within the deadband, then the method 300 proceeds to step 318 where a new PID output is computed, with only the P term being updated. In this step the integral (I) term is "frozen" at its previous value and only the P term is updated, using the formulae:

$P = 20\% * \text{Temperature Error}$ $PID_{Output} = P + I_{previous}$

If it is determined at step 316 that the temperature error is not within the deadband, the method 300 proceeds to step 320 where a new PID output is calculated by updating both the proportional term and the integral term, such as by using the following formulae:

$P = 20\% * \text{Temperature Error}$

If the current error is $\geq$ the previous error, $I = I_{previous} + 1\%$

If the current error is < the previous error, $I = I_{previous} - 1\%$ $PID_{Output} = P + I$ Again, those skilled in the art will recognize that the terms "20%" and "1%" in the above equations may be replaced by other appropriate percentages. The PID output (calculated at either step 318 or 320) may be used at step 322 to calculate a new airflow setpoint, which may be communicated to the flow control loop (e.g., see step 204 of the exemplary Slope Predictive Control method 200 above.) After the new PID output has been calculated at step 322, the method 300 returns to step 304 and repeats the calculations.

Figure 4:
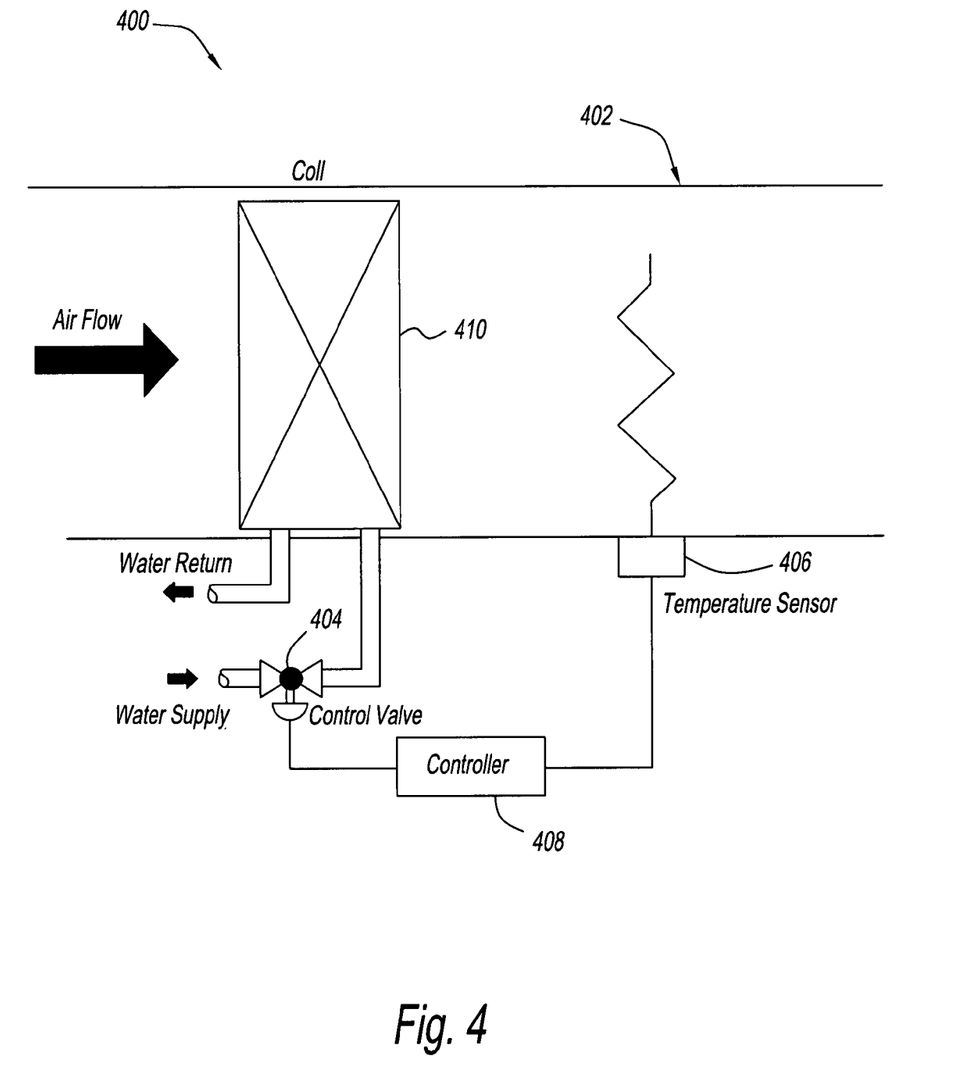
FIG. 4 is a pictoral diagram of an embodiment of the Pressure Independent VCT Control System of the present invention.

FIG. 4 is a pictorial diagram of an illustrative system 400 for implementing a Variable Temperature Control (VTC) temperature control algorithm of an exemplary embodiment of the present invention. The system 400 comprises a VTC box 402, a flow regulation device 404, a discharge air temperature sensor 406, a micro-controller 408, and a heat exchange device 410, such as a heating coil. The flow regulation device may for example, be a valve to control the volume of fluid or gas entering the heat exchange device 410, or any other suitable device known in the art to regulate the flow of fluids or gases through a heat exchange device 410. In the case of a valve, the position of the valve between 0%-100% open is typically controlled by an analog output from the VTC controller. The fluid or gas passing through heat exchange device 410 can be for heating or cooling, such as hot or cold water, respectively. The heat exchange device 410 can be of any shape appropriate for the system and may be composed of appropriate materials to best transfer the fluid or gas contained therein and/or to maximize the efficiency of the temperature transfer of the heat exchange device 410. One exemplary embodiment of a heat exchange device 410 could be a system of coils.

The flow control loop of system 400 measures the discharge air temperature, using measurements from the discharge air temperature sensor 406. Discharge air temperature measurements are used to calculate the slope of the flow regulation device response curve (change in discharge temperature per movement of the flow regulation device) every time the flow regulation device 404 moves for a measured portion of its stroke. For example, the flow control loop may be configured to calculate the change in discharge air temperature when the flow regulation device 404 moves for at least one second. A calculated change in discharge air temperature can then be used to predict how long the flow regulation device 404 must move in order to deliver the appropriate flow rate needed for maintaining the desired room temperature setpoint.

The flow regulation device 404 controls the flow rate of a non-solid substance through heat exchange device 410. The calculated position adjustment controls the increase or decrease in flow rate by operating to open or close the valve the correct amount. However, in an alternative embodiment of the current invention, the flow regulation device 404 may be in the form of a heating element with and associated setting as opposed to an associated runtime. Movement to a particular setting may replace movement for a particular runtime, as discussed above in the case of the damper of a VAV box. An associated runtime for the heating element may be represented by the time it takes the system to set the heating element to a selected setting. In the present embodiment, however, runtime is replaced by a predicted setting position, also referred to herein as the position adjustment.

If the temperature control loop makes a substantial change in the discharge air temperature setpoint, the nonlinear characteristic of the flow regulation device response curve may require more than one valve movement to achieve setpoint. In accordance with an aspect of the present invention, when large setpoint changes occur, an instantaneous reading may used to control the movement of the flow regulation device 404. For example, if an instantaneous measurement shows the system has passed the setpoint by more than the deadband and is still moving away from setpoint, then the slope predictive method may generate a new output to move the system back towards setpoint even though the predicted position has not yet been reached.

Therefore, once the flow control loop of system 400 has determined from the instantaneous discharge air temperature measurement that the actual discharge air temperature in the room is close to the discharge air temperature setpoint, the flow control loop calculates the slope of the flow regulation device response curve and is able to predict how far the flow regulation device 404 must move to reach the discharge air temperature setpoint. This corrective movement is made based on the flow regulation device position predicted by the flow control loop. The control loop does not base this corrective movement on instantaneous discharge air temperature measurements, which include a substantial amount of noise. The corrective movement of the flow regulation device 404 is based upon the sensitivity of the flow regulation device 404 measured in terms of average change in discharge air temperature over the initial flow regulation device movement.

Once the flow regulation device 404 completes the predicted movement, the flow regulation device 404 is stopped. The controller then monitors the discharge temperature to determine when the system has stabilized, and uses this measurement to update the position response constant of the system as appropriate. Then, the flow control loop measures the average discharge air temperature. The flow control loop uses the average discharge air temperature measurement because an average measurement reduces the noise in the flow measurement and provides an improved measurement of the actual discharge air temperature.

In a preferred embodiment of the present invention, the control loop uses the averaged discharge air temperature measurements without the problems that are normally encountered with averaging measurements, such as the delay introduced into the control loop. This is accomplished, in the present invention, through the predictive control scheme mentioned above. The predictive control scheme calculates the system sensitivity, the predicted movement of the flow regulation device needed to achieve setpoint, and then moves the flow regulation device to the predicted position.

Figure 5:
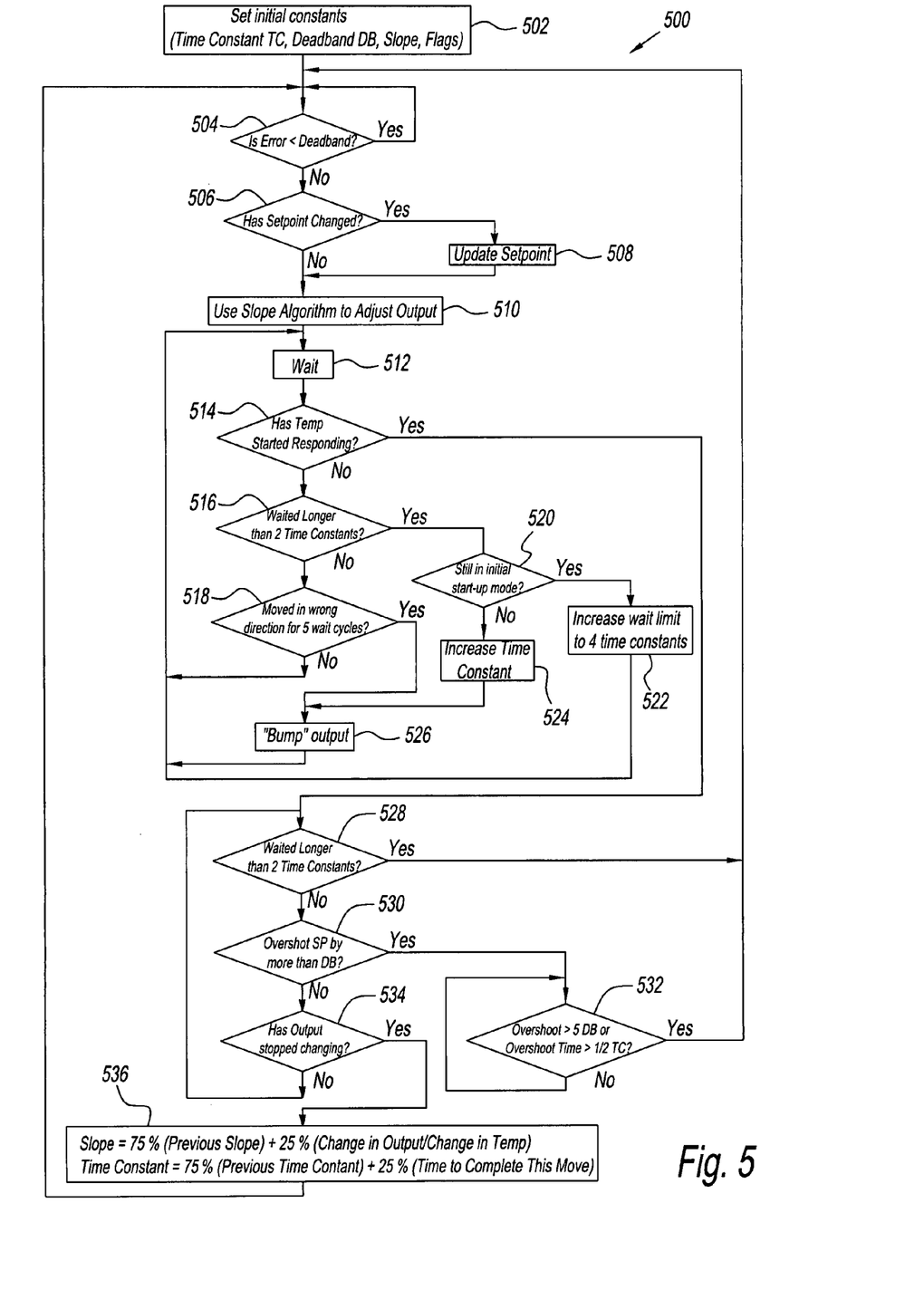
FIG. 5 is a flow diagram illustrating an embodiment of the slope predictive control method of the present invention.

FIG. 5 is a flow diagram illustrating an exemplary digital control method 500 used for controlling a flow regulation device to maintain a discharge temperature utilizing the VTC control algorithm described herein. The digital control method 500 begins at step 502 by setting initial values for the time constant, deadband constant, slope constant, and related flags. The heat exchange device's 410 time constant is not generally known by the personnel engineering the control system, the control algorithm for the heat exchange device control includes code which measures the actual system response and corrects the initial value as appropriate.

Next at step 504, a determination is made as to whether the temperature error is less than the deadband constant. The deadband constant may be defined by the system operator. The deadband is typically set so that the valve does not move if the measured temperature is within a specified tolerance of the setpoint. If at step 504 the temperature error is determined to be greater than the deadband constant, then the system repeats the determination of the error and proceeds back to step 504. If the temperature error is determined to be less than the deadband constant, then the method proceeds to step 506 where it is determined whether or not the temperature setpoint has changed. The temperature setpoint determines the target discharge air temperature for the system. If the setpoint has changed, then the method proceeds to step 508, where the setpoint value is updated in the temperature control system. The method then proceeds to step 510. However, if at step 506 it is determined that the setpoint has not changed, then the method proceeds directly to step 510.

At step 510, the data provided is used by the slope algorithm to adjust the discharge air temperature output level. The slope algorithm can be used to predict the movement required to achieve the new temperature setpoint.

After the temperature output is adjusted to the designated level, the method proceeds to step 512, where the control system waits for the expiration of an increment of time. After the increment of time expires, the method proceeds to step 514, where it is determined whether or not the temperature control system has started responding to the adjusted discharge air temperature output level. If step 514 determines that the system has started responding to the request for discharge air temperature output change, then the method proceeds to step 528. If step 514 determines that the system has not begun responding to the adjusted discharge air temperature output value, then the method proceeds to step 516, where a determination is made as to whether the system has waiting longer than a period of two time constants.

If the method in step 516 determines that the system has not waited longer than two time constants, then the method proceeds to step 518, where it is determined whether the discharge air temperature has moved in the wrong direction for a period of five consecutive wait cycles. If step 518 determines that the discharge air temperature has moved in the wrong direction for five consecutive wait cycles, then the method proceeds to step 526 where the output is bumped to the correct level. However, if step 518 determines that the discharge air temperature has not moved in the wrong direction for five consecutive wait cycles, then the method proceeds back to step 512 to wait for the expiration of an increment of time.

If the method in step 514 determines that the system has started responding to the request for discharge air temperature output change, then the method proceeds to step 528, where a determination is made as to whether the system has waited longer than a period of, for example, two time constants. If the method in step 528 determines that the system has not waited longer than two time constants, then the method proceeds to step 530, where it is determined whether the discharge air temperature change has overshot the setpoint temperature value by an amount greater than the deadband constant. However, if the method in step 528 determines that the system has waited longer than two time constants, then the method returns to step 504.

If the method in step 530 determines that the system has overshot the setpoint discharge air temperature by an amount greater than the deadband constant, then the method proceeds to step 532 where a determination is made as to whether the system has overshot the setpoint discharge air temperature by an amount greater than, for example, five times the deadband constant and whether the overshoot time is greater than one-half of the time constant. If the method at step 532 determines that the system has overshot the setpoint discharge air temperature by an amount greater than five times the deadband constant or that the overshoot time is greater than one-half of the time constant, then the method returns back to step 504 which is described fully above.

However, if the method at step 532 determines that the system has not overshot the setpoint discharge air temperature by an amount greater than five times the deadband constant, or that the overshoot time is greater than one-half of the time constant then the method returns to step 532 in a loop procedure until the system has overshot the setpoint discharge air temperature by an amount greater than five times the deadband constant, or the overshoot time is greater than one-half of the time constant.

If the method in step 530 determines that the system has not overshot the setpoint discharge air temperature by an amount greater than the deadband constant, then the method proceeds to step 534 where a determination is made as to whether the output is still changing. If step 534 determines that the output is still changing, then the method returns to step 528, which is described in detail fully above. If step 534 determines that the output is no longer changing, then the method proceeds to step 536, where the slope value is adjusted to equal the result of the addition of seventy-five percent of the previous slope and twenty-five percent of the time it took for the system to complete the move in temperature settings. Once the new slope value is computed, the method returns back to step 504 which is described fully above.

The specific examples provided above pertained to temperature and flow control in facility heating and air conditioning systems; however, the applicability of the present invention is not limited to these examples. The principles involved are equally applicable to any control system consisting of a controlled device (valve, damper, variable speed drive, etc.), a controlled variable (temperature, pressure, flow, current, etc.), and a feedback controller (digital or analog). Many other applications could be controlled by utilizing the principle of measuring the sensitivity of the system (the slope of the controlled variable versus controlled device relationship), utilizing this sensitivity to predict the change in the controlled device needed to obtain a desired change in the controlled variable, adjusting the controlled device according to this prediction, and using the results of this adjustment to update the sensitivity for subsequent adjustments. Furthermore, if the feedback controller utilizes a PID algorithm, the principles of defining two or more bands of operation, utilizing different gains within each band, and implementing modified PID actions as described in these claims can be equally valid for these other applications.

Although the present invention has been described above with reference to certain exemplary embodiments of a VTC Control System, many other modifications, features, embodiments and operating environments of the present invention will become evident to those of skill in the art. Thus, various alternative embodiments will become apparent to those skilled in the art and are considered to be within the spirit and scope of the present invention. It should be appreciated that many aspects of the present invention were described above by way of example only and are, therefore, not intended as required or essential elements of the invention. Furthermore, any references herein to predetermined values, minimum values, thresholds and/or specific formulae should be understood as being provided by way of illustration only. Predetermined values, thresholds and formulae may all be defined and re-defined by a system operator in order to better suit the present invention to a particular environment or situation.

Furthermore, from a reading of the foregoing description of certain exemplary embodiments, those skilled in the art will recognize that the slope predictive control and the digital PID control principles of the present invention may have applicability in control system other than VTC temperature control systems. In particular, the control principles of the present invention may be applicable in any non-linear control system, including any control system for controlling a damper, valve, inlet control vane, etc. Accordingly, although the present invention is described herein with reference to VTC temperature control systems, it should be understood that the description is provided by way of example only and not by way of limitation. Accordingly, the scope of the present invention is defined only by the appended claims rather than the by foregoing description of exemplary embodiments.

What is claimed is:

1. A method for implementing PID control having a proportional term, an integral term, and a derivative term, the method comprising:
    measuring a controlled variable;
    calculating an error between the controlled variable and a desired condition;
    comparing the error to a threshold;
    if the error is greater than the threshold, setting a PID output to a maximum value and accumulating the integral term;
    if the error is less than the threshold, determining whether the error is within a deadband;
    if the error is within the deadband, calculating the PID output by updating only the proportional term; and
    if the error is outside the deadband, calculating the PID output by updating the proportional term and the integral term;
    adjusting a control set point based upon the PID output; and
    controlling an adjustable control element of a control system based upon the control set point.

2. The method of claim 1, wherein the step of measuring the controlled variable comprises determining an average of the controlled variable over a period of time.

3. The method of claim 2, wherein the period of time comprises ten seconds.

4. The method of claim 1, further comprising defining the threshold by a user.

5. The method of claim 1, wherein the maximum value comprises 100% or 0%.

6. The method of claim 1, wherein accumulating the integral term comprises:
    saving a starting PD output percentage (Starting Output);
    setting a previous integral term $I_{previous}$) equal to 0 at startup; and
    accumulating the integral term using the formula: $I_{previous}$+(100%−Starting Output)/12.

7. The method of claim 1, wherein calculating the PID output by updating only the proportional term comprises:
    setting the proportional term equally to a percentage of the error; and
    adding the proportional term to the integral term.

8. The method of claim 7, wherein the percentage is 20 percent.

9. The method of claim 1, wherein calculating the PID output by updating the proportional term and the integral term comprises:
    setting the proportional term equal to a percentage of the error; and
    adding a second percentage to the integral term if a current error is greater than or equal to a previous error;
    subtracting the second percentage from the integral term if the current error is less than the previous error; and
    adding the proportional term to the integral term.

10. The method of claim 9, wherein the percentage is 20 percent.

11. The method of claim 9, wherein the second percentage is 1 percent.

12. The method of claim 1, wherein the controlled variable comprises an air temperature and the desired condition comprises a setpoint temperature.

13. The method of claim 12 wherein the control setpoint is an air flow setpoint, and wherein the adjustable control element controls airflow.

14. The method of claim 13 wherein the adjustable control element comprises a damper.

15. The method of claim 13 and further comprising:
    measuring airflow; and
    calculating an error between the measured air flow and the airflow setpoint.

16. The method of claim 15 wherein controlling the adjustable control element is based upon the error.

* * * * *